United States Patent [19]

Shouda

[11] Patent Number: 4,881,228
[45] Date of Patent: Nov. 14, 1989

[54] DEBUGGING MICROPROCESSOR

[75] Inventor: Masahiro Shouda, Tokyo, Japan

[73] Assignee: NEC Corporation, Tokyo, Japan

[21] Appl. No.: 114,285

[22] Filed: Oct. 29, 1987

[30] Foreign Application Priority Data

Oct. 29, 1986 [JP] Japan .................................. 61-258915

[51] Int. Cl.⁴ ............................................. G06F 11/00
[52] U.S. Cl. .................................... 371/19; 371/29.1;
364/900; 364/944.9
[58] Field of Search .......................... 371/19, 17, 29;
364/200 MS File, 900 MS File

[56] References Cited

U.S. PATENT DOCUMENTS

| | | | |
|---|---|---|---|
| 3,937,938 | 2/1976 | Matthews | 371/19 |
| 3,987,420 | 10/1976 | Badagnami | 371/19 |
| 4,308,581 | 12/1981 | Raghunathan | 371/19 |
| 4,410,938 | 10/1983 | Higashiyama | 371/19 |
| 4,635,193 | 1/1987 | Moyer | 371/19 |
| 4,755,997 | 7/1988 | Takahashi | 371/19 |

Primary Examiner—Michael R. Fleming
Attorney, Agent, or Firm—Foley & Lardner, Schwartz, Jeffery, Schwaab, Mack, Blumenthal & Evans

[57] ABSTRACT

A debugging processor includes a bus control unit for transmitting and receiving data to and from an external, an instruction execution unit receiving an instruction code from the bus control unit for executing the given instruction, and an interrupt control unit for notifying the instruction execution unit of an interrupt request. The debugging processor also comprises a debug interrupt response control unit having a priority higher than that of the interrupt control unit and having a fixed branch destination address. This debug interrupt response control unit operates to generate to the external a debug interrupt response signal which becomes active during a period of save operation for an internal information.

6 Claims, 4 Drawing Sheets

DEBUGGING MICROPROCESSOR

BACKGROUND OF THE INVENTION

1. Field of the Invention

The present invention relates to a microprocessor, and more specifically, to a debugging microprocessor used in a microprocessor development support system.

2. Description of Related Art

Heretofore, in order to debug a program under development, a target system to be debugged is coupled through a connector and cable to a microprocessor development support system which includes a debugging microprocessor and a controller so as to execute and debug a program under development instead of a microprocessor to be installed in the target system. In other words, the debugging microprocessor must execute a program stored in a memory of the target system to be debugged, and also a debugging program stored in another memory provided in the microprocessor development support system. In general, a microprocessor to be used in the target system to be debugged (called "target microprocessor" hereinafter) is used as a debugging microprocessor. In addition, in order to switch from the program to be debugged to the debugging program, a non-maskable interrupt (called "NMI" in some case hereinafter) for the target microprocessor is used.

Because of this non-maskable interrupt, the conventional microprocessor development support system using the target microprocessor as the debugging microprocessor could not have ensured a normal execution of the program to be debugged. Further, when the non-maskable interrupt from the target system to be debugged and the interrupt for break request concurrently occur, either one of these interrupts must be neglected. In addition, the save timing control for the non-maskable interrupt was very complicated.

SUMMARY OF THE INVENTION

Accordingly, it is an object of the present invention to provide a microprocessor development support system which is free from at least one of the above mentioned drawbacks.

Another object of the present invention is to provide a debugging processor capable of surely executing a debugging program.

Still another object of the present invention is to provide a debugging processor capable of coping with concurrent occurrence of the non-maskable interrupt from the target system to be debugged and the interrupt for the break request without neglecting either of these interrupts.

The above and other objects of the present invention are achieved in accordance with the present invention by a debugging processor which includes a bus control unit for transmitting and receiving data to and from an external, an instruction execution unit receiving an instruction code from the bus control unit for executing the given instruction, and an interrupt control unit for notifying the instruction execution unit of an interrupt request, characterized in that it comprises a debug interrupt response control unit having a priority higher than that of the interrupt control unit and having a fixed branch destination address, the debug interrupt response control unit operating to generate to the external a debug interrupt response signal which becomes active during a period of save operation for an internal information.

The above and other objects, features and advantages of the present invention will be apparent from the following description of the preferred embodiment of the invention with reference to the accompanying drawings.

BRIEF DESCRIPTION OF THE DRAWINGS

FIG. 3 is a block diagram of one embodiment of the debugging microprocessor in accordance with the present invention; and.

DESCRIPTION OF THE PREFERRED EMBODIMENT

Figure 1:
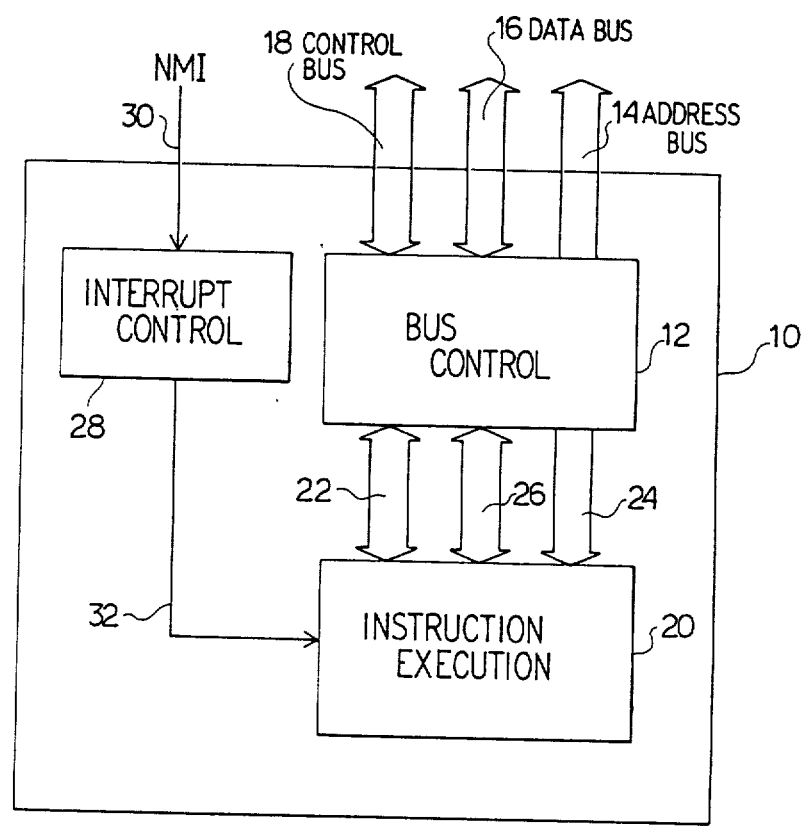
FIG. 1 is a block diagram of a conventional microprocessor.

Referring to FIG. 1, there is shown a block diagram of one conventional microprocessor, which is used as a target microprocessor in the target system to be debugged. The shown target microprocessor generally indicated by box 10 includes a bus controller 12 which outputs an address through an address bus 14 and sends and receives data through a data bus 16. The bus controller 12 also sends and receives through a control bus 18 a group of control signals which include a signal indicative of an internal condition, a wait signal, etc. Further, the bus controller 12 contains therein an instruction code buffer (not shown) and has a function of asynchronously prefetching an instruction proceeding to the instruction being executed in an execution unit 20.

This execution unit 20 sends an instruction code request to the bus controller 12 through a control bus 22, and receives an instruction code through an instruction code bus 24 from the bus controller 12 so as to execute the received instruction code. Further, the execution unit 20 sends and receives through a data bus 26 data generated as the result of execution of the instruction code, under control of a control signal transferred through the control bus 22.

In addition, the microprocessor 10 includes an interrupt controller 28 which receives a non-maskable interrupt 30. When the non-maskable interrupt 30 is rendered active, the interrupt controller 28 notifies the execution unit 20 of it through a line 32 so that the execution of the program is switched from the program to be debugged to the debugging program.

Figure 2:
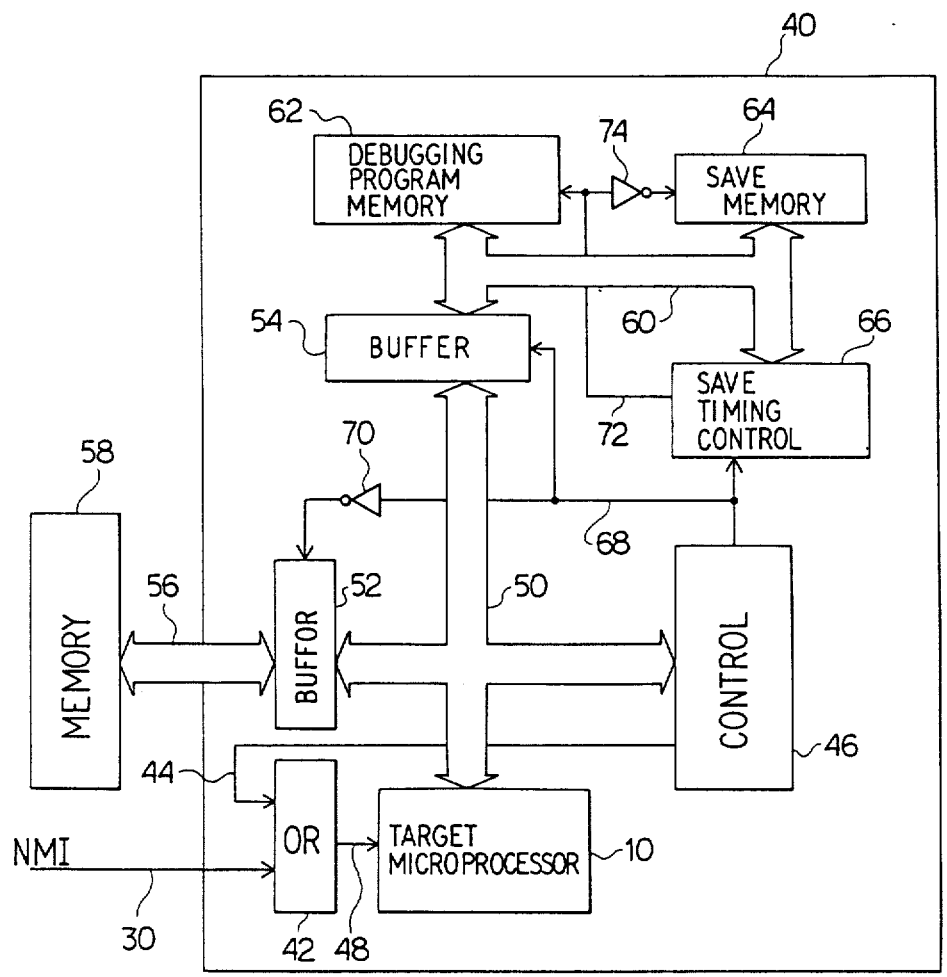
FIG. 2 is a block diagram of a microprocessor development support system which uses the conventional microprocessor.

Turning to FIG. 2, there is shown one example of the microprocessor development support system incorporating therein the target microprocessor 10 shown in FIG. 1. The microprocessor development support system is generally designated by 40, and includes an OR circuit 42 receiving at its one input the external non-maskable interrupt or NMI signal 30 and a break request signal 44 from a controller 46. The OR circuit 42 outputs a microprocessor NMI signal 48 to the target microprocessor 10, which is coupled to the controller 46 through an access bus 50. This access bus 50 is coupled to a pair of buffers 52 and 54.

To the buffer 52, there is coupled through another access bus 56 a memory 58 storing a program to be debugged for the target system. On the other hand, the buffer 54 is coupled to a third access bus 60 which is coupled to a debugging program memory 62, a save memory 64 for NMI and a save timing controller 66 for NMI.

The controller 46 generates a buffer selection signal 68, which is supplied to an input of the save timing controller 66 and a control input of the buffer 54. The selection signal 68 is also supplied via an inverter 70 to an control input of the buffer 52.

The save timing controller 66 generates a selection signal 72, which is supplied to the debugging program memory 62 and through an inverter 74 to the save memory. Specifically, the memory selection signal 72 is brought to a high level only during a period for a predetermined number of write operations carried out after the buffer selection signal 68 was brought to a low level. The debugging program 62 and the save memory 64 are rendered active when the memory selection signal 72 is at a low level.

The save memory 64 includes therein an address counter (not shown) and operates to mask an address outputted from the target microprocessor 10 for the write operation when the memory selection signal 72 is rendered active, so that the save memory carries out the write operation in accordance with the address outputted from the address counter contained in the save memory. The address counter is incremented at each write operation.

In the microprocessor development support system as mentioned above, when the buffer selection signal 68 is at a high level, the buffer 52 is maintained active, and therefore, the target microprocessor 10 executes the instructions stored in the memory 58 for the program to be debugged. In this condition, if the NMI signal 30 is inputted from the target system, the target microprocessor 10 carries out the NMI operation for the target system.

When the controller 46 detects that the system is in a condition that a break is necessary, it makes the break request signal 44 active so as to cause the debugging program to be executed. The break request signal 44 is inputted to the OR circuit 42, which in turn makes active the microprocessor NMI signal 48.

When the microprocessor NMI signal 48 is made active, the target microprocessor 10 will move to the NMI operation as soon as an instruction being executed at that time has been executed. However, since the execution unit and the bus controller in the target microprocessor operate in asynchronism to each other, it is not possible to discriminate the completion of instruction execution from an external to the microprocessor. Therefore, the controller 46 detects the movement to the NMI operation of the target microprocessor by decoding the address on the access bus 50. In ordinary cases, when the target microprocessor 10 moves to the NMI operation, the target microprocessor 10 reads the content of a fixed address where a branch address for the NMI operation program is written.

After the break request signal 44 is generated, when the controller 46 detects the reading of the fixed address for the NMI operation, the controller 46 brings the buffer selection signal 68 to a low level, so that the buffer 52 is rendered inactive and the buffer 54 is rendered active.

Thus, the target microprocessor 10 reads the branch destination address for the NMI from the debugging program memory 62, and thereafter, performs a save operation for a program counter (not shown) and a program status word (not shown) in the microprocessor. In this situation, the save address for the program counter and the program status word is the value of a stack pointer (not shown). However, the save address is not sure at this time, and so, the NMI save memory 64 is used as a saving area.

After the buffer selection signal 68 has been brought to a low level, the NMI save timing controller 66 brings the memory selection signal to a high level only during a period for the saving operation of the program counter and the program status word. Thereafter, the target microprocessor 10 starts to execute the break program.

In the above mentioned microprocessor development support system using the target microprocessor as the debugging microprocessor, when the controller 46 makes the break request signal 44 active, the target microprocessor 10 is, in some cases, executing an instruction for reading the content of the NMI fixed address, not the NMI operation itself. In this case, when the address reading is detected the controller 46 will bring the buffer selection signal 68 to a low level, and therefore, the debugging program will not be normally executed.

Particularly, in the case of writing the content of the NMI fixed address to the memory 64 after the reading of the NMI fixed address, an unexpected value has been often written in the NMI save memory 64. Further, since the system is made such that the content of the NMI fixed address is written into the NMI save memory 64 only a predetermined number of times or accesses, the content of the debugging program memory 62 will be destroyed by accesses for the NMI saving exceeding the predetermined number of accesses. As a result, the debug cannot be executed thereafter.

Further, the microprocessor NMI signal 48 is generated by either the break request signal 44 or the external NMI signal 30. Therefore, the system is such that when the break request signal 44 and the external NMI signal 30 are concurrently made active, the break request signal 44 is preferentially processed. As a result, the NMI signal 30 from the target system to be debugged will be neglected.

In addition, in some cases the target microprocessor 10 has a data width of 16 bits. In this case, if the access is performed for the NMI saving, the required time or number of writing is different between a case in which the stack pointer indicates an even-numbered address in a 8-bit unit and another case in which the stack pointer indicates an odd-numbered address. Because of this, the save timing controller is complicated in construction.

The above mentioned disadvantages of the debugging processor and the microprocessor development support system in the prior art can be overcome by the debugging processor and the microprocessor development support system in accordance with the present invention.

Figure 3:
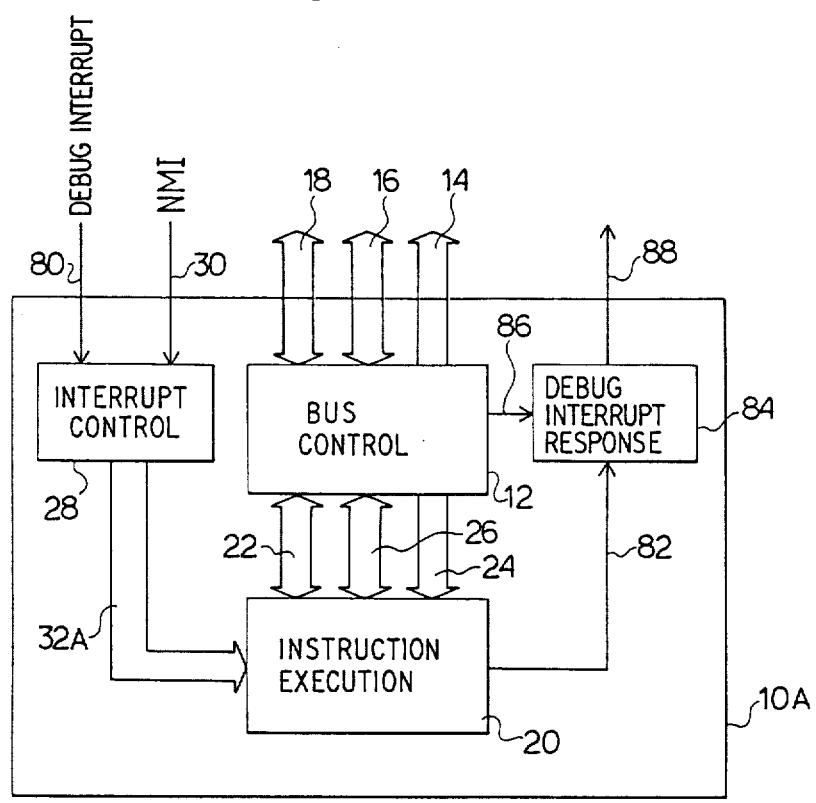

Referring to FIG. 3, there is shown in a block diagram one embodiment of the debugging microprocessor in accordance with the present invention. In FIG. 3, elements similar to those shown in FIG. 1 are given the same reference numerals, and explanation will be omitted.

As seen from comparison between FIGS. 1 and 3, the interrupt controller 28 provided in the debugging processor shown in FIG. 3 receives the NMI signal 30 and a debug interrupt signal 80 independently of each other and operates to notify, through an interrupt control bus 32A, the execution unit 20 that the interrupt has been received by the controller 28. When the execution unit 20 acknowledges the debug interrupt, the execution unit 20 notifies a debug interrupt response controller 84 of it through a debug interrupt response control bus 82.

The bus controller 12 notifies a bus cycle for saving operation of a program counter and a program status word, which is performed as the debug interrupt response, to the debug interrupt response controller 84 through a debug interrupt response synchronizm bus 86. Thus, during the bus cycle for the saving operation of the program counter and the program status word, the debug interrupt response controller 84 generates a debug interrupt response signal 88 in synchronism with the bus cycle. Further, the instruction execution unit 20 holds a fixed branch destination address for the debug interrupt, and therefore, it is not necessary to read the branch destination address from an external.

Next, description will be made on operation of the above mentioned debugging microprocessor.

If the debug interrupt signal 80 is made active, the interrupt controller 28 notifies the execution unit 20 of the request of the debug interrupt through the interrupt control bus 32A. In response to the notice of the request of the debug interrupt, the execution unit 20 will move to the save operation for the program counter and the program status word after the execution completion of the instruction being executed at that time. The execution unit 20 then declares to the debug interrupt response controller 84 through the debug interrupt response control bus 82 that the save operation for the program counter and the program status word will be carried out.

Thereafter, the execution unit sends to the bus controller 12 through the data bus 26 and the control bus 22 an instruction indicating to write the contents of the program counter and the program status word to the memory in accordance with a stack pointer at that time. The bus controller 12 executes the save operation for the program counter and the program status word by means of the address bus 14, the data bus 16 and the control bus 18 after the completion of the bus cycle being executed when the instruction is inputted.

The bus controller 12 informs the debug interrupt response controller 84 through the debug interrupt response synchronism bus 86 that the bus cycle for the save operation of the program counter and the program status word is under execution. In response to this, the debug interrupt response controller 84 makes active the debug interrupt response signal 88 only during the bus cycle in which the bus controller 12 executes the save operation for the program counter and the program status word in response to the debug interrupt.

Before reading from the bus controller 12 a first instruction after the execution unit 20 has instructed the bus controller 12 so as to save the program counter and the program status word for the debug interrupt, the execution unit 20 notifies the debug interrupt response controller 84 through the response control bus 82 that the response to the debug interrupt has been completed.

Furthermore, when the NMI signal 30 and the debug interrupt signal 80 are concurrently rendered active, the interrupt controller 28 firstly notifies the execution unit 20 that the NMI signal 30 has become active, and thereafter, notifies the execution unit 20 that the debug interrupt signal 80 has become active. Therefore, the execution unit 20 reads the content of the memory location storing the NMI branch destination address for the purpose of the NMI operation, and then, performs the save operation for the program counter and the program status word, and thereafter, moves to the operation of the debug interrupt.

Specifically, when it goes to the operation for the debug interrupt, the program counter then stores the branch destination address for the NMI operation. Therefore, the branch destination address for the NMI operation is saved from the program counter in the save operation for the program counter and the program status word caused in response to the debug interrupt. Accordingly, when the operation is returned from the debug interrupt, the operation for the NMI is started. Accordingly, even if the NMI signal 30 and the debug interrupt signal 80 are concurrently rendered active, the NMI is never neglected.

Figure 4:
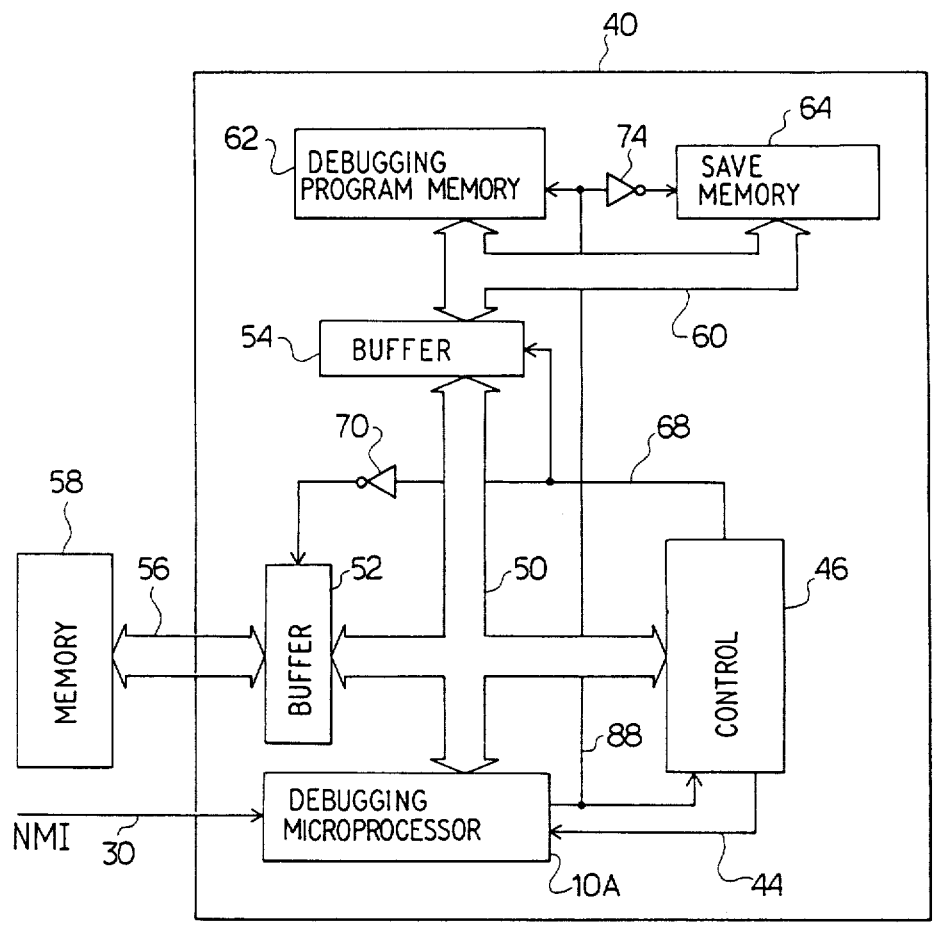
FIG. 4 is a block diagram of a microprocessor development support system which uses the debugging microprocessor shown in FIG. 3.

Turning to FIG. 4, there is shown one embodiment of the microprocessor development support system incorporating therein the debugging microprocessor shown in FIG. 3. In FIG. 4, elements similar to those shown in FIG. 2 are given the same reference numerals, and explanation will be omitted.

The debugging microprocessor 10A directly receives the NMI signal 30 from an external and the break request signal 44 (i.e., the debug interrupt 80 in FIG. 3) from the controller 46. The debugging microprocessor 10A outputs the debug interrupt response signal 88 to the controller 46, the debugging program memory 62 and the inverter 74 connected to the save memory 64. But, the save timing controller 66 and the OR circuit 42 are omitted.

In the above mentioned microprocessor development support system, when the debugging microprocessor 10A executes the program stored in the memory 58 and to be debugged, if the controller 46 makes the break request signal 44 active, the debugging microprocessor 10A acknowledges the break request signal 44, and then, makes the debug interrupt response signal 88 active (i.e., at a high level in the embodiment of FIG. 4) in synchronism with the bus cycle for saving the program counter and the program status word.

From the debug interrupt response signal 88, the controller 46 detects the timing at which the program counter and the program status word are saved after the debugging microprocessor 10A has acknowledged the break request signal 44. Accordingly, whatever instructions are executed by the debugging microprocessor 10A when the break request signal 44 is made active by the controller 46, there is no possibility that the controller 46 misunderstands the timing of the save operation for the program counter and the program status word performed by the debugging microprocessor in response to the break request signal 44.

Further, when the debug interrupt response signal 88 is brought to a high level, the controller 46 brings the buffer selection signal 68 to the low level. In addition, the debug interrupt response signal 88 is used as a signal for selection between the debugging program memory 62 and the NMI save memory 64. As mentioned above, since the debug interrupt response signal 88 is brought to a high level only during the period of the save operation for the program counter and the program status word performed in response to the break request signal 44, the contents of the program counter and the program status word are written to the NMI save memory 64. For this reason, the NMI save timing controller has become unnecessary.

Furthermore, the break request signal 44 and the NMI signal 30 are independently supplied to the debugging microprocessor 10A, and therefore, even if these signals 44 and 30 are concurrently made active, the NMI signal 30 is not neglected by the debugging microprocessor 10A.

As seen from the above description with reference to the drawings, the debugging microprocessor for the exclusive use is used in place of the target microprocessor. The debugging microprocessor makes it possible for the microprocessor development support system to clearly recognize the response cycle of the debugging microprocessor to the break request. Therefore, the microprocessor development support system will not miss the response cycle of the debugging microprocessor, and so, will not malfunction as the result of the mistiming.

Further, since the interrupt from the system to be debugged and the interrupt for the break request are distinguished by the debugging microprocessor, neglect of the interrupt request will not occur even if the two interrupts are concurrently requested. In addition, since the debug interrupt response signal is made active only for the period of the save operation of the program counter and the program status word, no save timing controller for the program counter and the program status word is required.

The invention has thus been shown and described with reference to the specific embodiments. However, it should be noted that the invention is in no way limited to the details of the illustrated structures but changes and modifications may be made within the scope of the appended claims.

I claim:

1. A debugging processor comprising:

a bus control unit for transmitting and receiving data, address and control signals to and from an external microprocessor development support system, an instruction execution unit coupled to transmit and receive data and address signals to and from the bus control unit and also to receive an instruction code from the bus control unit for executing the given instruction, said instruction execution unit having a fixed branch destination address for a debug interrupt operation, an interrupt control unit coupled to receive at least a debug interrupt from the external microprocessor development support system and for notifying the instruction execution unit of an interrupt request, and a debug interrupt response control unit having a priority higher than that of the interrupt control unit, said execution unit operating in response to the notification of the interrupt request from the interrupt control unit to instruct the bus control unit to start an internal information save operation after there have been completed an execution of an instruction which is being executed when the instruction execution unit is notified of the interrupt request, the execution unit also operating to notify the debug interrupt response control unit of the instruction of the internal information save operation to the bus control unit, said bus control unit responding to the instruction of the internal information save operation from the execution unit to output a signal indicative of an execution of a bus cycle for the internal information save operation to the debug interrupt response control unit, in synchronism with a bus cycle of the bus control unit, after there has been completed a bus cycle which is being executed when the start of the internal information save operation of the execution unit is detected, so that the debug interrupt response control unit operates to generate to the external microprocessor development support system a debug interrupt response signal which becomes active only during a period of save operation for the internal information, and thereafter, the execution unit operating to move into an operation for the debug interrupt.

2. A microprocessor development support system coupled with a first memory external of the microprocessor development support system and storing a program to be debugged and also coupled to receive a non-maskable interrupt from a device external of the microprocessor development support system, comprising:

a controller coupled to the first memory through an internal access bus, said controller generating a break request, a second memory storing a debugging program and being coupled to the internal access bus, a third memory coupled to the internal access bus so as to save a necessary information, and a debugging microprocessor selectively coupled to one of the first memory and the second memory so as to execute the program to be debugged and the debugging program, said debugging microprocessor receiving the non-maskable interrupt and the break request independently of each other for generating a debug interrupt response signal to the controller and the second and third memories, said debugging microprocessor operating in such a manner that when the non-maskable interrupt and the debug interrupt are concurrently generated, the debugging microprocessor is firstly operable to read a branch destination address for a non-maskable interrupt operation so as to write the branch destination address for the non-maskable interrupt operation to a program counter, and then is operable to save the content of the program counter to the third memory while outputting to the controller a debug interrupt response signal which becomes active only during a period of save operation for the program counter, and thereafter, the execution unit operating to move into an operation for the debug interrupt.

3. A system claimed in claim 4 wherein the debugging processor includes a bus control unit for transmitting and receiving data to and from an external, an instruction execution unit receiving an instruction code from the bus control unit for executing the given instruction, an interrupt control unit receiving the non-maskable interrupt and the break request for notifying the instruction execution unit of an interrupt request, and a debug interrupt response control unit having a fixed branch destination address and coupled to the execution unit and the bus control unit so as to generate the debug interrupt response signal.

4. A system claimed in claim 3 wherein the interrupt control unit receives a non-maskable interrupt and a debug interrupt independently of each other, and when the non-maskable interrupt and the debug interrupt are concurrently generated, the interrupt control unit firstly notifies the execution unit that the non-maskable interrupt has been requested, and thereafter, notifies the execution unit that the debug interrupt has been requested.

5. A system claimed in claim 4 wherein when the execution unit is notified that the non-maskable interrupt has been requested, the execution unit reads the content of a memory location storing a branch destination address for a non-maskable interrupt operation, and when the execution unit is thereafter immediately notified that the debug interrupt has been requested, the execution unit performs the save operation for a program counter and a program status word, and then, moves to the operation of the debug interrupt.

6. A debugging microprocessor comprising a bus control unit for transmitting and receiving data, address and control signals to and from an external microprocessor development support system, comprising:

an instruction execution unit coupled to transmit and receive data and address signals to and from the bus control unit and also to receive an instruction code from the bus control unit for executing the given instruction, said instruction execution unit having a fixed branch destination address for a debug interrupt operation, an interrupt control unit coupled to receive a non-maskable interrupt and a debug interrupt independently of each other for notifying the instruction execution unit of an interrupt request, said debug interrupt being supplied from the external microprocessor development support system, and a debug interrupt response control unit having a priority higher than that of the interrupt control unit, said interrupt control unit operating in such a manner that when the non-maskable interrupt and the debug interrupt are concurrently generated, the interrupt control unit firstly notifies the execution unit that the non-maskable interrupt has been requested, and thereafter, immediately notifies the execution unit that the debug interrupt has been requested, said execution unit operating in response to the notification of the non-maskable interrupt request to read a branch destination address for a non-maskable interrupt operation so as to write the branch destination address for the non-maskable interrupt operation to a program counter, and operating in response to the notification of the debug interrupt request to instruct the bus control unit to start a program counter and program status word save operation, after the writing of the branch destination address for the non-maskable interrupt operation to the program counter has been completed, said execution unit also operating to notify the debug interrupt response control unit of the instruction of the program counter and program status word save operation to the bus control unit, the bus control unit responding to the instruction of the program counter and program status word save operation from the execution unit to output a signal indicative of an execution of a bus cycle for the program counter and program status word save operation to the debug interrupt response control unit, in synchronism with a bus cycle of the bus control unit, after there has been completed a bus cycle which is being executed when the start of the program counter and program status word save operation of the execution unit is detected, so that the debug interrupt response control unit operates to generate to the external microprocessor development support system a debug interrupt response signal which becomes active only during a period of save operation for the program counter and program status word, and thereafter, the execution unit operating to move into an operation for the debug interrupt.

* * * * *